April 18, 1950     T. B. MARTIN ET AL     2,504,559
DUAL ROTATION PROPELLER

Original Filed Aug. 19, 1943     2 Sheets-Sheet 1

INVENTORS
THOMAS B. MARTIN
KENNETH L. BERNINGER
BY
Spencer, Hardman, + Fehr
ATTORNEYS April 18, 1950     T. B. MARTIN ET AL     2,504,559
DUAL ROTATION PROPELLER
Original Filed Aug. 19, 1943     2 Sheets-Sheet 2
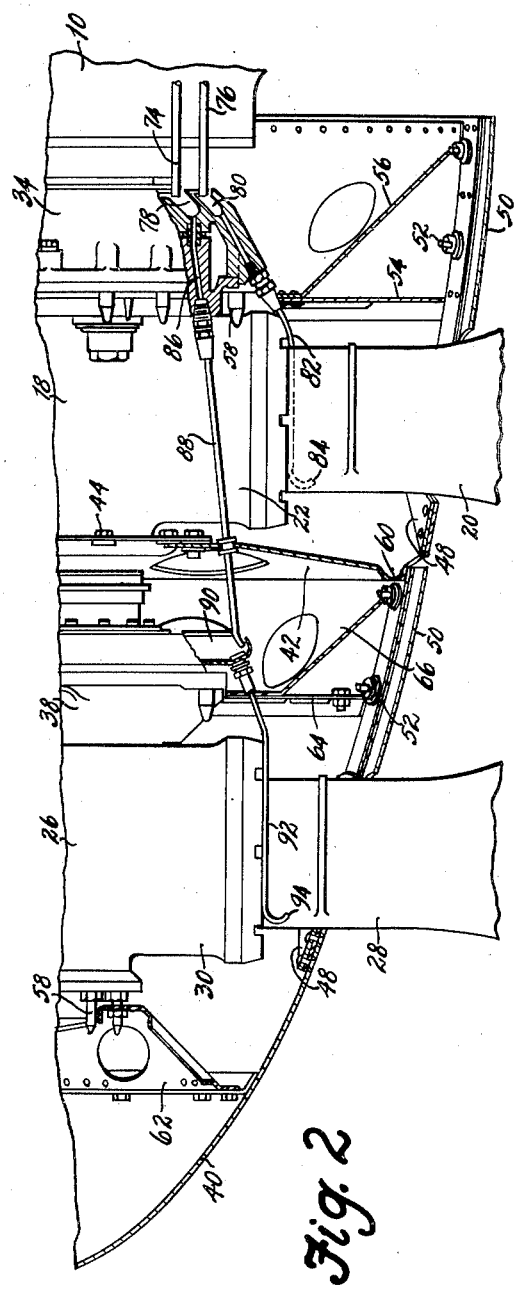
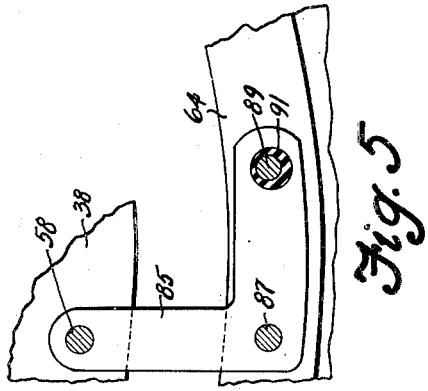
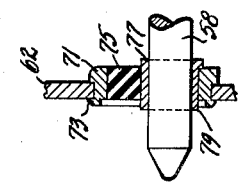
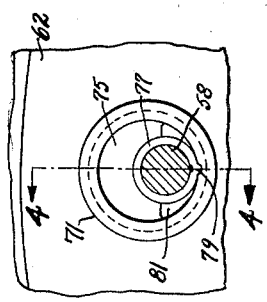
INVENTORS
THOMAS B. MARTIN
KENNETH L. BERNINGER
BY Spencer, Hardman & Fihr
ATTORNEYS Patented Apr. 18, 1950

2,504,559

UNITED STATES PATENT OFFICE 2,504,559

DUAL ROTATION PROPELLER

Thomas B. Martin and Kenneth L. Berninger, Dayton, Ohio, assignors to General Motors Corporation, Detroit, Mich., a corporation of Delaware Original application August 19, 1943, Serial No. 499,240. Divided and this application February 7, 1946, Serial No. 646,156

4 Claims. (Cl. 170—135.28)

This invention relates to aircraft propellers of the tandem type in which two complete propeller assemblies, rotate in opposite directions, and are hydraulically controlled to constant speed operation, which speed is selectible at a remote point within the cockpit.

This application is a division of original application on Serial Number 499,240, filed August 19, 1943 (Patent No. 2,421,514, dated June 3, 1947).

A still further object is to provide a propeller of the class specified in which the contributing propeller assemblies are wholly complete in themselves and self contained with respect to their control mechanism and hub fairing means or spinner, with built-in anti-icing means, whereby mounting on a drive shaft obviates the necessity of linkage and levers with complicated adjustments.

Yet another object is to provide a dual rotation propeller with hub fairing that will preserve the streamlining of the craft, yet not require excessive time and technicians for installation.

Contributing to the principal or foregoing objects is the object to provide anti-icing means for both propeller assemblies, and to protect the delivery of an anti-icing medium against dispersion until delivered at the root of the intended blade.

Another object of the invention is to provide spinners for coaxial counter rotating propeller assemblies and means for supporting the spinners so that the streamlined continuity of the fuselage will be maintained.

Another object of the invention is to provide spinners for enclosing the hubs of aircraft propellers and mount them on shock absorbing supports having a greater resistance to vibration in a radial direction than in a circumferential direction.

Further objects and advantages of the present invention will be apparent from the following description, reference being had to the accompanying drawings wherein preferred embodiments of the present invention are clearly shown.

In the drawings:

Fig. 2 is an elevational view of the dual propeller mechanism with some parts in section to show the protected circuit of the anti-icing means.

Figs. 3, 4 and 5 are detail views of the outboard spinner mounting.

Figure 1:
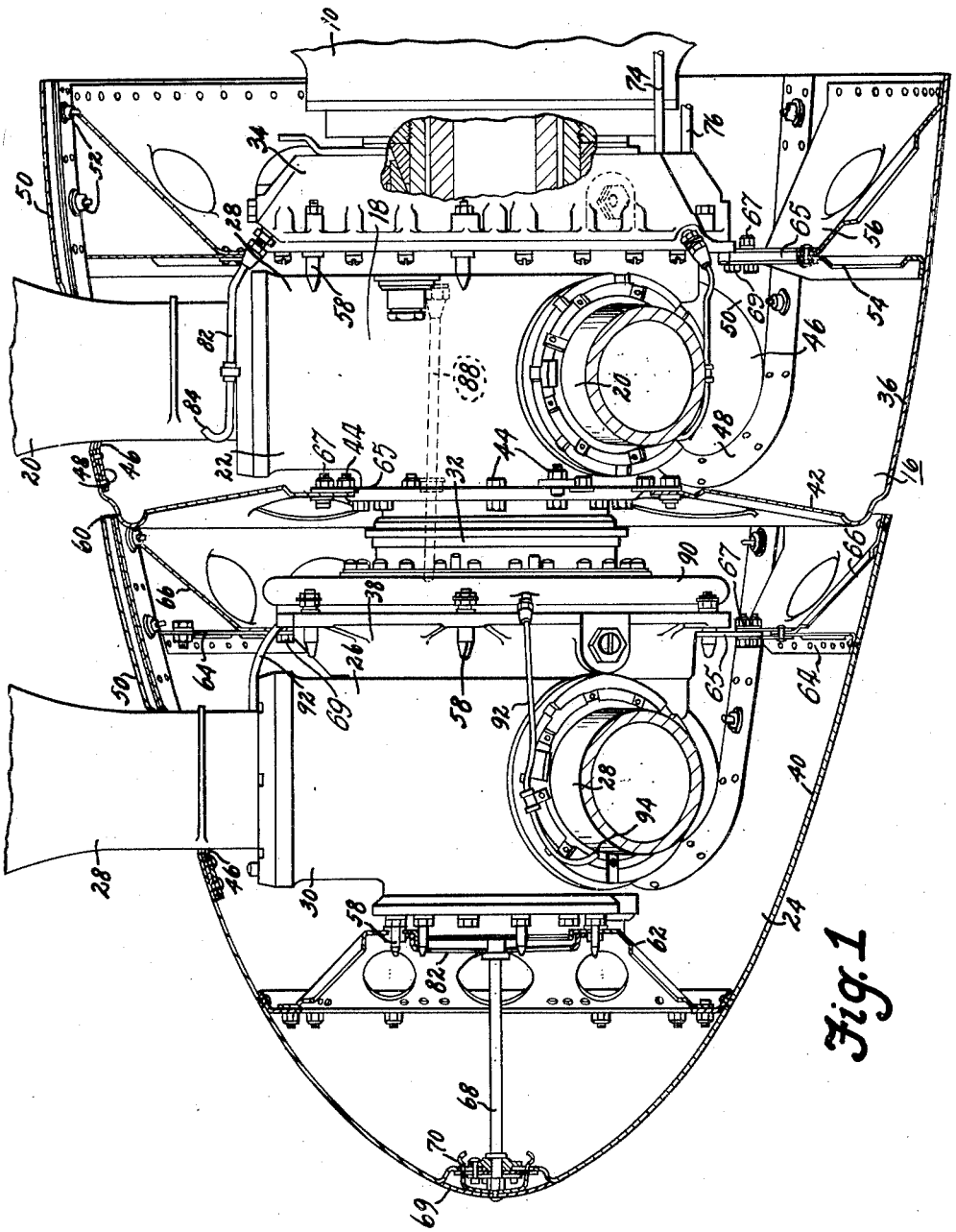
Fig. 1 is a side elevational view of a dual rotation propeller with spinner parts in section for the sake of clearness in illustration.

Referring generally to the drawings, and specifically with respect to Figs. 1, and 2, 10 refers to the engine nose or gear-casing of an aircraft from which projects in rotative relation a pair of oppositely rotating telescopically arranged shafts. Mounted on the radially outer shaft is an inboard propeller unit 16 comprising a hub 18 fitted with a desired number of controllable pitch blades 20 extending from blade socket 22. Mounted on the radially inner shaft is an outboard propeller unit 24 comprising a hub 26 fitted with a desired number of controllable pitch blades 28 extending from sockets 30. Both propeller units are provided with individual automatic pitch controlling mechanism built-in as self contained units, so that one propeller and its control mechanism may be mounted on the shaft 12, and the other propeller and its control mechanism may be mounted on the shaft 14, simply by moving the units respectively in place on their shafts and then securing with appropriate shaft nuts. In so doing, an interconnecting mechanism 32 situated between the hubs 18 and 26 appropriately connects the control mechanism of one propeller unit with the control mechanism of the other propeller unit as will be described in due course. Suffice it then, here, to say, that the inboard hub 18 with its blades 20, is affixed with a control unit or regulator 34, and supports a spinner section 36 suitable to be mounted on the shaft 12 adjacent to the engine nose 10, and provides a part of the interconnecting mechanism 32, at its forward end. And likewise, the outboard hub 26 with its blades 28 and affixed with a control or regulator 38, supporting a spinner section 40, is also provided with a cooperating part of the interconnecting mechanism 32, and is mountable on the shaft 14.

The spinner sections 36 and 40 are each substantially generated conic portions designed to blend in with the nacelle of the craft and provide proper fairing for the hubs so that streamlining of the craft is preserved from the air piercing portion at the axis of the propeller shaft throughout the length of the craft. Contributing toward that, the spinner section of the inboard propeller 16 comprises a truncated conic portion of sheet metal or the like, provided with a flange or head portion 42 at its smaller end that is adapted to be fastened to the front end of the hub 18 by screw devices 44, while its peripheral surface is notched at 46 to allow for passing of the blades 20. The notches 46 are reinforced with strips 48 secured on the inside of the shell 36 and provide ledges for reception of filler plates 50 which span the cut outs 46 and where they are secured by quickly detachable fasteners 52. Attached to the inside of the spinner shell 36 and near the base end there are webs 54 and 56 which, as the spinner is moved inwardly, engage supporting pilot pins 58 positioned around the periphery of the regulator 34. Thus, when the spinner section is mounted in place, the base end of the spinner projects aft far enough to extend over the end of the engine nosing 10, while its forward end projects sufficiently far enough ahead of the propeller disc of rotating blades to end in an offset portion 60 outwardly of the interconnecting mechanism 32.

The spinner section 40 for the outboard propeller comprises a generated cone inside of which there is fastened a head-member 62, and web portions 64, 66 by which the section is similarly supported on the hub 26 and regulator 38. To this end, the web portions 54, 56 and 64, 66 are secured at their radially inward bounds to plates or clips 65 by screw devices 67, the plates 65 in turn being secured to the boundary of the regulators 34 or 38 by the screw devices 69 holding the parts of the regulators together. It, like the section 36 for the inboard propeller is slidable over the hub and blade roots to engage the pilot pins, but is additionally characterized by holding means in the form of a rod 68 anchored to the hub 26. A cover plate 69 covers the head of the rod 68 where it is held by a spring lock 70 at the air piercing end of the cone. The section 40 is similarly notched at 46 and the unoccupied portions are filled in by the plates 50, all so that the base end of the generated cone 40 may overlap outward of the offset portion 60.

Vibration absorbing means are adopted for supporting the spinner sections 36 and 40 and incorporate the structure as shown in Figs. 3 and 4. The circumferentially inner flange of the respective heads or webs 62, 64, 54 and 56 are apertured to receive a flanged bushing 71 which is peened over at 73 for retention purposes. The bushings 71 are of considerably larger bore than the studs or pilot pins 58 over which they are to be disposed, and bonded to the inside of the bushing there is a crescent shaped piece of yieldable material such as rubber 75 the inner arc of which is bonded to a short length of tube 77 having its edges staked at 79 to engage the inner periphery of the bushing 71. The tubular portion 77 has a bore substantially commensurate with the cross section of the pilot pin 58, or such that the two may be engaged in easy slidable engagement. Thus the pilot receiving portion of the anchorage is to one side of the center of the bushing 71, and in mounting the bushing within the spinner supporting web or head, advantage is taken of this offset relation to absorb the load of the clamping thrust in mounting. To accomplish that, the bushing is so located that the widest portion of the rubber body will be disposed radially outward of the pilot pin so that any inward flexing of the spinner shells will tend to compress the rubber section, while the lateral movement of the same may be permissible for absorption of vibration. That presents a structure in which radial outward movement of the spinner sections with respect to the pilot pins will be restrained because of the firm metallic contact or engagement on the pilot pins yet circular oscillations about the axis of propeller rotation will be permissible. That is particularly accounted for by providing the voids 81 in the rubber in the region of tube and bushing engagement substantially as shown in Fig. 3.

An alternative vibration absorbing mount is shown in Fig. 5, where an angled bracket 85 is secured to the inner periphery of the webs 64, 66 by a pivot 87 and a screw device 89 having a rubber or like bushing 91 to absorb the vibration. The other leg of the angled bracket is receptive of the pilot pin 58 carried at the rim of the regulator 38.

Thus in mounting the spinner sections, with the cover plates 50 removed, they are passed over the hub portion so that the notches 46 straddle the blades and so that the vibration supporting means each engage a pilot pin 58. In the case of the inboard propeller the forward portion of the spinner section 36 is secured to the hub 18 by the screw devices 44. In the case of the outboard propeller the spinner section 40 is passed over the blades until the vibration absorbing means engage the pilot pins 58 both in the regulator 38 and on the front portion of the hub where the forward spinner section is retained in position by the rod 68. The rod 68 threads into a plate in the forward end of the hube 26 and springs a bridge piece 82 whose outer extremities engage the inner periphery of the head member 62 to force it into seating relation against the hub face plate. With either spinner section secured in place, the cover plates 50 can be secured in place.

The spinner sections 36 and 40 in addition to fairing the hub portions of each propeller, provide a housing for anti-icing means or ice-inhibiting means, and protects the anti-icing medium against unwanted distribution before it is delivered to a selected point on the blade. Provision is made for conducting anti-icing fluid to the roots of the blades from a suitable reservoir and includes the transmission tubes 74 and 76 disposed to empty into a pair of slinger grooves 78 and 80 in a rotating part of the inboard propeller structure. As illustrated in Fig. 2, the slinger groove 80 connects with delivery tubes 82 that slant outwardly and curve around the root of the blades 20 to end at a point near the leading edge of the respective blade, such as indicated at 84. Connecting with the slinger groove 78 a cross-passage 86 through the regulator 34 communicates with a transmission tube 88 slanting outwardly so that centrifugal force will empty the anti-icing fluid into a slinger groove 90 provided on the outboard propeller unit, and from which, delivery tubes 92 lead out to points 94 near the leading edge on the blades of the outboard propeller. When the propeller mechanism is rotating the anti-icing medium delivered by the tubes 74 and 76 empties into the grooves 78 and 80 from whence, by the outward inclination of the connecting passages, the medium is delivered to the roots of the blades on the inboard propeller and to the groove 90 of the outboard propeller, and thence to the roots of the blades of the outboard propeller. The ends of the tubes 74, 76 and 88 are continually open and are supported closely adjacent to the grooves into which they empty, but not to be mechanically engaged thereby, that no opportunity for wind and rapidly moving air currents is afforded to carry away the fluid before it reaches the desired points of delivery. However, due to the design and support of the spinner structure, all connections of the fluid passages for the anti-icing medium are enclosed well within the confines of the spinner where the wind and air movement will have little effort upon open junctures of the passages.

While the embodiments of the present invention as herein disclosed, constitute preferred forms, it is to be understood that other forms might be adopted, all coming within the scope of the claims which follow.

What is claimed is as follows:

1. An aircraft propeller installation, comprising in combination, a pair of concentric contrarotative propeller shafts extending from an engine nosing, a pair of propellers, each comprising a hub and pitch shiftable blades mounted on the said shafts, a spinner section of conic form for each hub, means for mounting each section on its hub, including a bulk-head, braced web portions, pilot pins on the hub for supporting the web portions, and vibration absorbing means carried by the web portions for seating on the pilot pins, and positive retention means for securing the head members to the hubs, the spinner section for the outboard propeller having an air piercing cone with a base portion fairing in with the contour of the rear section and a rod axially connecting the apex of the cone to the hub of the outboard propeller for retaining the spinner on the pilot pins.

2. An aircraft propeller installation, comprising in combination, a pair of concentric contrarotative propeller shafts extending from an engine nosing, a pair of propellers, each comprising a hub and pitch shiftable blades mounted on the said shafts, a spinner section for each hub mounted to rotate therewith, means for mounting each section on its hub including web portions extending radially inward to engage the hub, pilot pins carried by the hub, and rubber filled grommets at the inner bounds of the webs receivable over the pilot pins, said grommets comprising a flanged bushing secured in the web and having a relatively large opening, a sleeve adapted to slide over one of the pilot pins and disposed within the opening of the bushing eccentric of the said large opening, and yieldable material bonded to the inside of the flanged bushing and to the outside of the sleeve to maintain the eccentric relation, and means securing the grommet in the web so that the yieldable material is disposed radially outward of the respective pilot pin when the spinner is mounted on the hub, whereby vibration and load forces transmitted to the spinner sections from the hub are damped, and means for securing the spinner sections in their piloted relation.

3. An aircraft propeller installation, comprising in combination, a pair of concentric contrarotative propeller shafts extending from an engine nosing, a pair of propellers, each comprising a hub and pitch shiftable blades mounted on the said shafts, a spinner section for each hub mounted to rotate therewith, means for mounting each section on its hub including web portions extending radially inward to engage the hub, pilot pins carried by the hub, grommets carried by the web portions surrounding the pilot pins and provided with sleeves eccentrically located on the grommets for frictionally engaging the pilot pins, and yieldable rubber like cushions between the grommets and sleeves and bonded thereto, said grommets locating the cushions radially outward of the axis of propeller rotation, whereby gyrational forces are substantially eliminated, and means for securing the spinner sections in their piloted relation on the respective hubs.

4. An aircraft propeller installation, comprising in combination, a pair of concentric contrarotative propeller shafts extending from an engine nosing, a pair of propellers, each comprising a hub and pitch shiftable blades mounted on the said shafts, a spinner section for each hub mounted to rotate therewith, means for mounting each section on its hub including web portions extending radially inward toward the hub, angled brackets secured to the extended web portions to pivot thereon at its angle, one arm of the bracket being secured to the web by a pin and yieldable bushing for limited oscillation, the other arm of said bracket extending radially inward to overlap a portion of the hub, pilot pins carried by the hub for engaging apertures of the said overlapping bracket arm, whereby gyrational forces transmitted to the spinner are damped, and radial movement due to centrifugal forces are substantially eliminated.

THOMAS B. MARTIN.
KENNETH L. BERNINGER.

REFERENCES CITED

The following references are of record in the file of this patent:

UNITED STATES PATENTS

| Number | Name | Date |
|---|---|---|
| 2,129,565 | Clay | Sept. 6, 1938 |
| 2,353,578 | Marshall | July 11, 1944 |
| 2,375,673 | Marshall | May 8, 1945 |
| 2,421,514 | Martin et al. | June 3, 1947 |

FOREIGN PATENTS

| Number | Country | Date |
|---|---|---|
| 832,913 | France | Oct. 6, 1938 |
| 539,880 | Great Britain | Sept. 26, 1941 |
| 544,425 | Great Britain | Apr. 13, 1942 |
| 554,453 | Great Britain | July 5, 1943 |